United States Patent [19]

Wedmore

[11] 4,175,214
[45] Nov. 20, 1979

[54] APPARATUS AND METHOD FOR A PULSE REGENERATION SYSTEM

[75] Inventor: William R. Wedmore, Glen Ellyn, Ill.

[73] Assignee: GTE Automatic Electric Laboratories Incorporated, Northlake, Ill.

[21] Appl. No.: 931,716

[22] Filed: Aug. 7, 1978

[51] Int. Cl.² .................................................. H04L 5/24
[52] U.S. Cl. ................................ 179/15 BW; 178/50; 179/15 AW
[58] Field of Search .......... 179/15 BW, 15 A, 15 BL, 179/15 AW; 178/50

[56] References Cited

U.S. PATENT DOCUMENTS

| | | | |
|---|---|---|---|
| 3,761,621 | 9/1973 | Vollmeyer | 178/50 |
| 3,927,268 | 12/1975 | Sciulli | 179/15 BW |
| 4,093,823 | 6/1978 | Chu | 179/15 BW |

*Primary Examiner*—David L. Stewart
*Attorney, Agent, or Firm*—Frank J. Bogacz

[57] ABSTRACT

A pulse regeneration system for the sampling of a number of asynchronous pulse sources and for transmission of these pulses over a common data channel to a remote location. The transmitted pulses are delayed in time, but their width is reproduced with a high degree of integrity. The pulses transmitted by the system need not be of uniform time duration.

11 Claims, 2 Drawing Figures

APPARATUS AND METHOD FOR A PULSE REGENERATION SYSTEM

BACKGROUND OF THE INVENTION

(1) Field of the Invention

This invention concerns a pulse regeneration system for sampling and remotely transmitting a number of asynchronous pulses and more particularly concerns a technique for transmission of these pulses on a fixed rate communication channel without introducing variations in the timing of the state transistions represented by these pulses due to delays encountered in buffering.

(2) Description of the Prior Art

The problem of transmitting messages of a number of sources can easily be solved by utilizing a multiplicity of sending and receiving instruments. Each particular source may have a unique sending and receiving instrument associated with it. Since, sending and receiving instruments such as a pair of data sets are expensive, the above solution in prohibited. In addition, the high cost of telephone lines to connect the multiplicity of data set pairs together, requires that there be a high percentage of utilization of the transmission equipment and each telephone line.

In U.S. Pat. No. 3,535,450 issued on Oct. 20, 1970 to W. Vollmeyer, a method for transmitting a plurality of coded messages in time multiplex manner is shown. Notification of a change in the binary state of a pulse source associated with the time multiplex system is transmitted in response to the transmission of a synchronization pulse that immediately follows a modulation condition change in the pulse source that corresponds to the change in its binary state.

It is frequently desired to scan a number of data sources, which exhibit binary state transitions. For example, these binary state changes may result from telephone trunks or subscriber stations going off-hook, on-hook, sending dial pulses or ticketing and metering pulses, which occur at random. Additionally, it may be desired to transmit these binary state transitions to a remote point via a common data channel of fixed capacity in such a way as to permit an image of the individual binary state changes to be reconstructed without timing distortion. Accordingly, it is the object of the present invention to provide an apparatus and method whereby binary state changes from a number of asynchronous pulse sources may be sampled, multiplexed and enqueued for transmission over a common data channel of fixed rate without introducing variations in the timing of the binary state changes due to variations in queuing delays.

SUMMARY OF THE INVENTION

The present invention consists of a pulse regeneration system for the sampling of a number of asynchronous pulse sources and for remote transmission of the information contained in these pulses over a common data channel. This system consists of transmitting and receiving logic.

Each pulse generated by a pulse source consists of two state changes. (a transition from logic "0" to logic "1" and a corresponding transition from logic "1" to logic "0") The invention described herein samples a number of pulse sources in order to detect the binary state changes associated with each source.

A clock circuit is connected to and controls the scanning of the pulse sources via the incrementing of a scan counter. The scan counter is connected to an input multiplexor and transmits an address for each pulse source to be sampled. The output signals of the multiplexor are connected to memory control circuitry. Exclusive OR gates connect the memory control circuitry to the message enqueuing circuitry. The message enqueuing circuitry is connected to the transmitting data set which is controlled by the clock circuit.

When a state change is detected, a message containing the identity of the state change and the time or occurrence is formatted. The formatted message is then queued for transmission by gating the message to a first available message queue register included in the message enqueuing circuitry. If more than one pulse source has had a binary state change during the same scan cycle, a similar message will be formatted and queued for each such pulse source. The number of unique message queue registers utilized by the present invention is a function of the number of pulse sources to be scanned and the rate at which they are to be scanned.

As the message queue registers are filled, this condition is detected and the transmission of the first queued message is initiated via the transmission data set of the communication channel.

The clock circuit provides periodic pulses, controlling both the transmitting data set of the communication channel and the scan counter which in turn controls the sampling of the pulse sources through the multiplexor.

At the receiving location, a receiver data set is connected to a clock circuit and to a serial-to-parallel receive register. The clock circuit controls a scan index counter to synchronize message processing. The output signals of the receive register are connected to message queuing circuitry which in turn is connected to gating and comparison circuits. The output signals of the gating circuits are coupled to processing equipment, such as a stored program switching center.

When a transmitted message is received by the receive data set of the communication channel, pulses derived from the incoming data are counted by clock circuit logic. The clock circuit logic serves to synchronize the receive message queue logic by calculation of the scan cycle index number.

As each message is serially received, it is assembled in parallel form in a receive register. When the receive register contains a complete message, the completed message is gated into the next available receive message queue register. Control of the receive message queue registers included in the message queuing circuitry is maintained by a combination of pointers and control logic (also included in the message queuing circuitry) which calculate the identity of the next message queue register to be filled and also of the next message queue register to be sent to the processing equipment.

The contents of each of the receive message queue registers is compared with the calculated value of the scan index counter to determine whether the contents of the message is to be sent to the processing equipment. If the comparison indicates non-equality, the comparator logic provides a gating signal so that the message may be sent from the appropriate message queue register to the processing equipment. The contents of all message queue registers which match the value of the current scan index are sent one-at-a-time via the gating logic to the processing equipment.

The operation of the transmitting message queue registers is analogous to the operation and control of the receive message queue registers.

As a result of the operation of the pulse regeneration system, the transmitted pulses which arrive at the remote location are delayed in time, but the width of each pulse is faithfully reproduced with a high degree of integrity. A preferred embodiment of the pulse regeneration system described herein, is able to scan up to 1,024 pulse sources within a 20 ms. scan cycle interval. The receiving and sending data sets utilized by this system are of moderate price and speed. A speed of 2400 baud being sufficient to accommodate the requirements of the present system. The scan cycle counter is a three-bit-counter. This means that all the binary state change messages are delayed 8 scan intervals or 160 ms.

DESCRIPTION OF THE PREFERRED EMBODIMENT

The invention disclosed herein consists of a pulse regeneration system for the sampling of a number of asynchronous pulse sources and for remote transmission of these pulses over a common data channel. The pulse regeneration system includes two portions (transmitting logic and receiving logic) connected by a communication channel. The first portion consists of scanning and message formulation equipment. The second portion consists of pulse reception, reconstruction and retransmission equipment.

This system samples such pulse sources as telephone trunks, subscriber stations, metering or ticketing information or other binary asynchronous information. These pulses are transmitted remotely for reconstruction and retransmission to other processing equipment, such as stored program switching systems.

Figure 1:
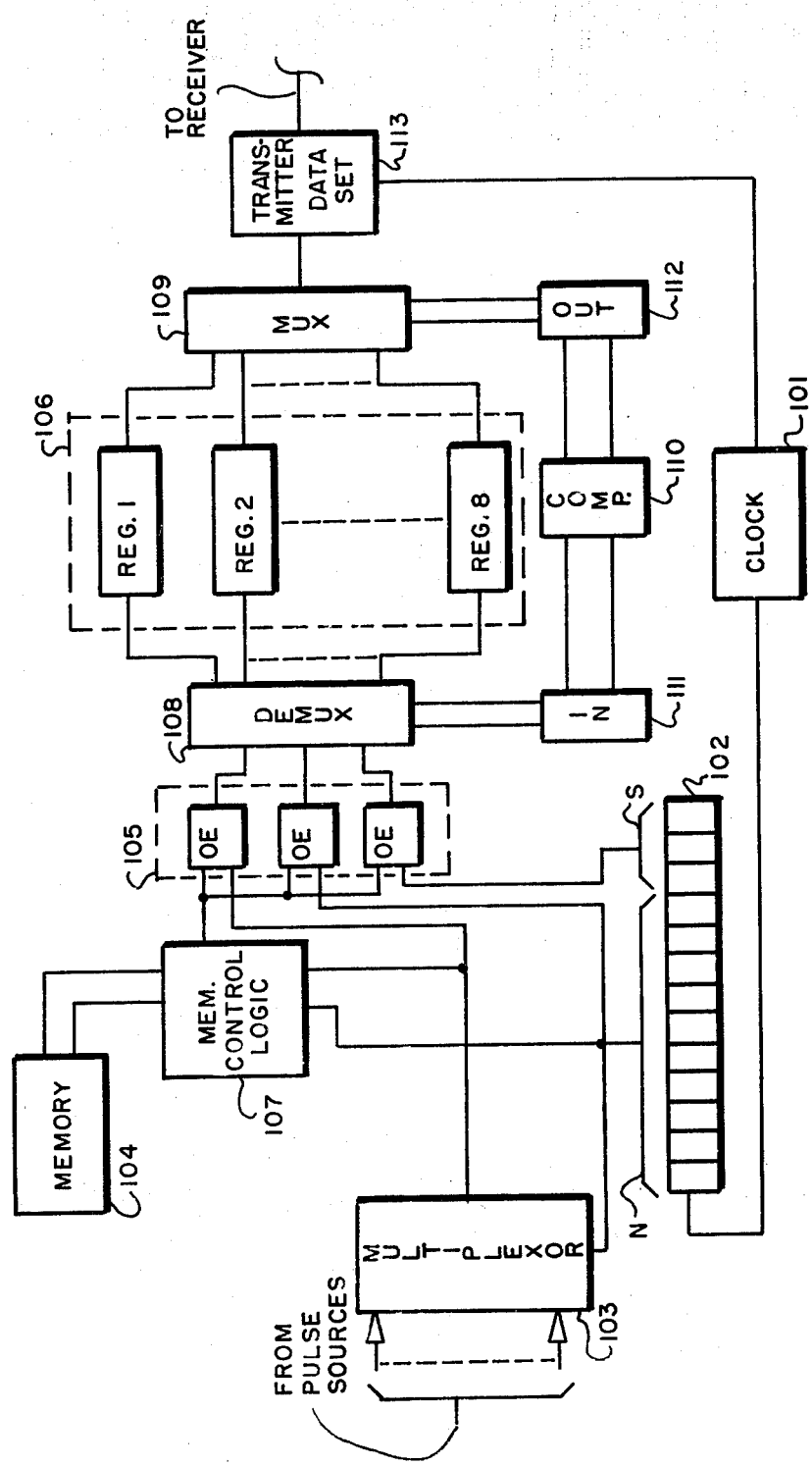
FIG. 1 is a schematic diagram of the scanning and transmission logic in the present invention.

Referring to FIG. 1, clock circuit 101 controls the scanning of the above-mentioned pulse sources. Clock circuit 101 is connected to scan counter 102 so that for each count of clock circuit 101 scan counter 102 is incremented. Scan counter 102 is connected to the input multiplexor 103. The low order digits N of scan counter 102 constitute the address of the pulse source that is to be sampled. Upon each clock count, scan counter 102 transmits the pulse source address N to input multiplexor 103. At this time, the value of the pulse source is sampled.

The input multiplexor 103 is connected to memory control logic 107 and to one of the exclusive OR gates 105. The sampled data is gated through the input multiplexor 103 to the memory control logic 107. Memory control logic 107 compares the value of the sampled pulse source with the contents of memory 104 as accessed by the address N of the particular pulse source. The contents of memory 104 contain the last-look value of each of said pulse sources. Each sampled value is compared to the last-look value contained in memory 104. If the last-look value and the present value of the pulse source match, no action is taken by the system. Then the next clock count of clock 101 initiates that the next sequential pulse source is to be scanned under control of the scan counter 102.

However, if a binary state status change is detected, a status change message is formulated by the system. Simultaneously, the status change information, the pulse source address N and the scan cycle S are gated through demultiplexor 108 by exclusive OR gates 105 into an appropriate one of the message queue registers 106. In addition the contents of memory 104 as addressed by the pulse source address N is updated to contain the most recent pulse status change.

The loading of a formulated message into one of the message queue registers 106 is controlled by the input pointer 111. The input pointer 111 initially points to the first message queue register of message queue register group 106. Demultiplexor 108 controls the switching of the formulated message into the appropriate message queue register indicated by input pointer 111. As each message queue register of group 106 is loaded, comparator 110 increments input pointer 111 to point to the next successive message queue register.

For each complete scan of all pulse sources, the low order digits N of scan counter 102 are reset and the high order digits S are incremented by one.

As a message is loaded into one of the message queue registers 106 comparator 110 controls output pointer 112 so that, output pointer 112 points to the first received message. Under control of output pointer 112, multiplexor 109 selects the formulated message indicated by output pointer 112 and switches said message through multiplexor 109 to the transmitter data set 113 of the communication channel. The data set 113 then serializes these messages for remote transmission to a receiver data set.

As each message is removed from the message queue 106, output pointer 112 is incremented by comparator 110 to point to the message queue register containing the next succeeding message to be transmitted. When the input pointer 111 and the output pointer 112 are of equal value the message queue 106 is empty. When the input pointer 111 is of value less than the output pointer 112 the message queue 106 is detected as being full. Input pointer register 111, output pointer register 112 and comparator 110 are disclosed in block form only, since the details of these circuits are believed well known and are not considered to constitute novel additions to the present invention, it being only required that they perform the functions outlined above. Units capable of performing the above-outlined functions are commercially available as intregrated circuits. For example, input pointer register 111 and output pointer register 112 may readily be implemented utilizing 4-bit binary counters (SN54191 or SN74191). Comparator 110 may be implemented utilizing a 4-bit magnitude comparator (SN5485 or SN7485). Reference *The Intregrated Circuits Catalog for Design Engineers*, First Edition.

Figure 2:
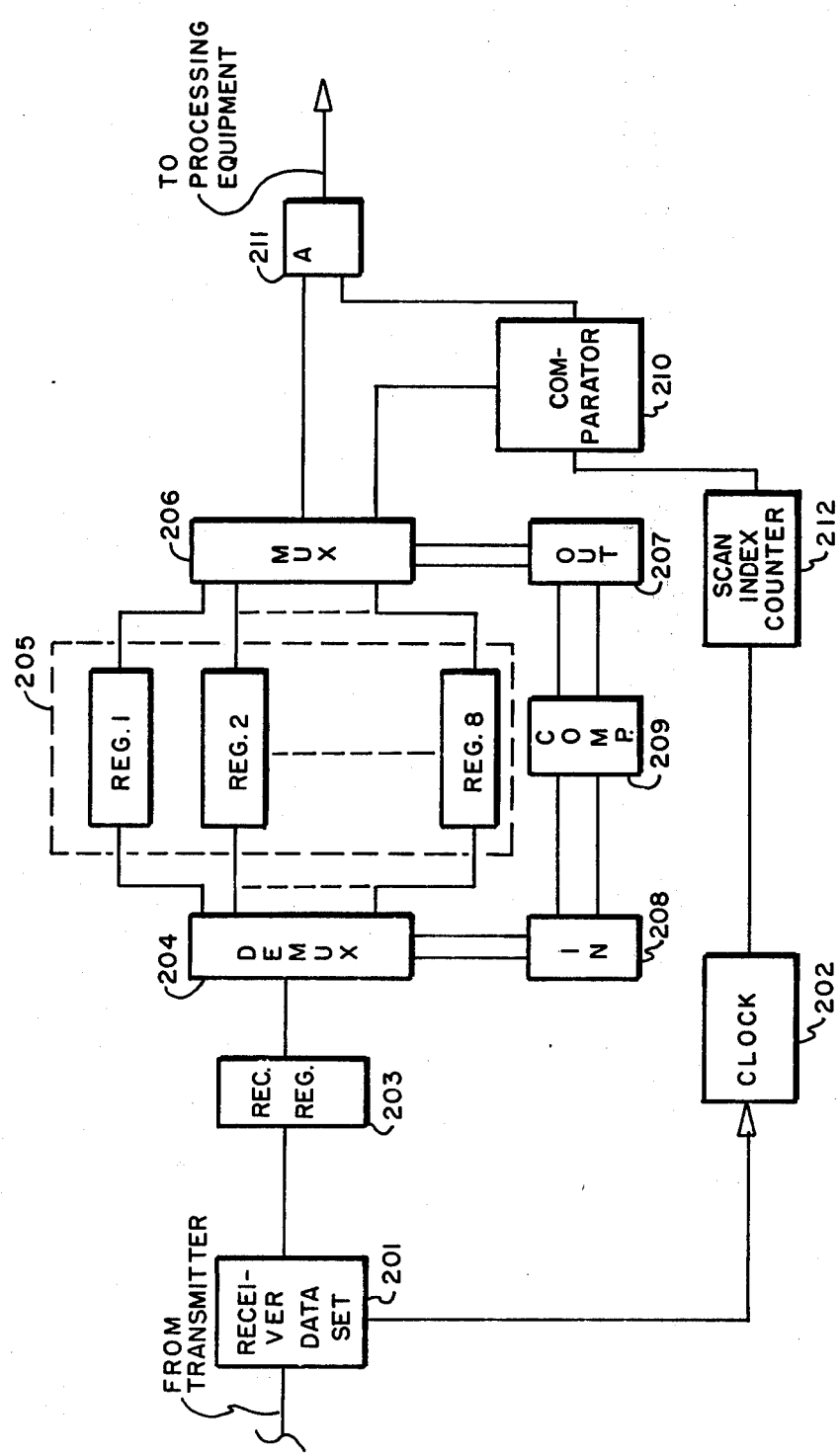
FIG. 2 is a schematic diagram of the receiving and reconstruction logic of a pulse regeneration system in accordance with the present invention.

Referring to FIG. 2, the transmitted message is received via the receiver data set 201 of the communication channel. The receiver data set 201 is connected to clock 202 and receive register 203. Pulses derived from the arriving data of receiver data set 201 are counted by clock circuit 202 to synchronize the message receiving logic shown in FIG. 2. As each arriving message is serially received by the receiver data set 201, it is assembled in parallel form, in the receive register 203.

Receive register 203 is connected to demultiplexor 204, and demultiplexor 204 is operable to select any message queue register of the group 205. At the close of each transmission cycle of receiver data set 201, the received message which is stored in receive register 203 is gated through the demultiplexor 204 into the next available message queue register of the group 205. The selection of message queue registers is controlled by the input pointer 208, connected between demultiplexor 204 and comparator 209. Initially, the input pointer indicates that the next received message is to be allocated to register one of group 205. As each message is stored into the appropriate message queue register of the group 205, input pointer 208 is incremented by one via the comparator 209.

The output pointer 207 is connected between the comparator 209 and the multiplexor 206. The output pointer 207 indicates the message queue register containing the next message to be retransmitted to the processing equipment.

At the close of each message cycle, the message contained in the particular message queue register of group 205 as indicated by output pointer 207 is examined. The above-indicated message is gated through multiplexor 206 to comparator 210. Scan index counter 212 is connected between clock circuit 202 and comparator 210. The comparator 210 matches the scan cycle S of the received message with the scan cycle as calculated by scan index counter 212. If a comparison results in a match, the indicated message is transmitted to the processing equipment via AND-gating means 211. In addition, comparator 209 increments output pointer 207 to point to the next message queue register of the group 205. Input pointer register 208, output pointer register 207 and comparator 209 are disclosed in block form only, since the details of these circuits are believed well known and are not considered to constitute novel additions to the present invention, it being only required that they perform the functions outlined above. Pointer registers 207 and 208 may be implemented utilizing 4-bit binary counters, and comparator 209 may be implemented utilizing a 4-bit magnitude comparator. For the commercial logic number designations of these units, reference the discussion of pointer registers 111 and 112 and comparator 110 as set forth in the description of the transmission logic of the present invention.

Consider table shown below. The scanning, transmission and reconstruction of the three pulses (A1, B1 and C1) is shown. During transmitting scan cycle 0, pulses A1 and B1 are detected and queued. During scan cycle 1, pulse C1 is detected and pulse A1 is removed from the message queue and transmitted via the communication channel. During transmitting scan cycle 2, pulse B1 is transmitted via the communication channel and pulse A1 is received by the receiving data set. Scan cycle 3 shows pulse C1 transmitted by the transmitting data set and pulse B1 received by the receiving data set. Transmitting scan cycle 4 shows pulse C1 received by the receiving data set. As each of the pulses was received it was stored in an appropriate message queue register. As the messages were received, scan index counter began to count the receiving scan cycles. At the receiving scan cycle count of 0, which is eight scan cycles after the transmitting scan cycle count of 0, pulses A1 and B1 are retransmitted from the receiving message queue registers to the processing equipment. During receiving scan cycle 1, pulse C1 is retransmitted to the processing equipment.

In this manner each pulse is reconstructed, delayed in time by eight scan cycles, but reproduced exactly in terms of duration. Each scan cycle is 20 ms. in duration. The communication channel operates at a rate of 2400 baud. There are 1024 pulse sources scanned during each scan cycle.

TABLE

| Transmitting Scan Cycle | Pulse Detected | Transmitted | Received | Pulses Retransmitted | Receiving Span Cycle |
|---|---|---|---|---|---|
| 0 | A1, B1 | | | | 1 |
| 1 | C1 | A1 | | | 2 |
| 2 | | B1 | A1 | | 3 |
| 3 | | C1 | B1 | | 4 |
| 4 | | | C1 | | 5 |
| 5 | | | | | 6 |
| 6 | | | | | 7 |
| 7 | | | | A1, B1 | 0 |
| 0 | | | | C1 | 1 |
| 1 | | | | | 2 |
| 2 | | | | | 3 |
| 3 | | | | | 4 |
| ... | | | | | ... |

Although a preferred embodiment of the invention has been illustrated, and that form described in detail, it will be readily apparent to those skilled in the art that various modifications may be made therein without departing from the spirit of the invention or from the scope of the appended claims.

What is claimed is:

1. A pulse regeneration system for the transmission of information composed of a plurality of binary state changes of non-uniform time duration from a plurality of asynchronous pulse sources over a communication channel to processing equipment located remote to said pulse sources, comprising:

transmission means including:

multiplexor means adapted to scan said pulse sources for sampling the status of each of said sources;

clock circuit means including a circuit connection to said communication channel, operated to generate periodic pulses of at least first and second frequencies;

scan counter means connected between said multiplexor means and said clock circuit means, operated in response to said periodic pulses of a first frequency to operate said multiplexor means to scan said pulse sources, and further operated to produce a first and a second output signal representing the location and time of occurrence of said pulse source, respectively;

memory means for storing the status of each of said pulse sources;

memory control means connected to said memory means and to said multiplexor means operated in response to detection of a binary state status change of any one of said pulse sources, to update said memory means and to further produce a third output signal representing said binary status change;

message queue means connected to said memory control means, to said scan counter means and to said communication channel, operated in response to said first and second output signals of said scan counter means and to said third output signal of said memory control means to formulate messages describing the location, time and occurrence of said binary state change and to store said messages for subsequent transmission;

said communication channel operated in response to said periodic pulses of a second frequency from said clock circuit to transmit said stored messages to said remote processing equipment via said communication channel; and receiving means at said remote location connected between said communicaton channel and said processing equipment initially operated to receive said transmitted messages and further operated to regenerate the transmitted status changes associated with each of said pulse sources.

2. A pulse regeneration system as claimed in claim 1, wherein: said scan counter means includes a first counter for controlling said multiplexor means to scan said pulse sources and a second counter serially connected to said first counter so that said second counter is incremented for each cycle of said first counter, whereby said second counter indicates the ordinal number of the scan cycle on which a status change of said pulse source was detected and said first and second counters in combination indicate the location and time of said state change.

3. A pulse regeneration system as claimed in claim 1, wherein: said message queue means includes a demultiplexor connected to said memory means through said memory update control means and to said scan counter means;
a plurality of message queue registers, each of said registers providing for storage of one of said status change messages; and
a multiplexor connected between each of said plurality of message queue registers and said communication channel operated to transmit serially each of said messages in said message queue means serially through said communication channel to said receiving means.

4. A pulse regeneration system as claimed in claim 3, wherein there is further included:
an input pointer register connected to said demultiplexor;
an output pointer register connected to said multiplexor; and
a comparator connected between said input pointer register and said output pointer register operated to allocate the next available message queue register to an incoming message and to control the transmission of the next available queued message to said communication channel.

5. A pulse regeneration system for the transmission of information in the form of a plurality of binary state changes of non-uniform time duration of a plurality of asynchronous pulse sources over a communication channel to remote processing equipment, comprising:
transmission means connected between said pulse sources and said communication channel for formulating messages representing the location and time of said binary state status changes and transmitting said formulated messages to said processing equipment;
receiving means including:
scan index counter means connected to said communication channel, operated in response to said messages transmitted over said communication channel to calculate the duration of each of said binary state changes represented by said messages;
message queue means connected to said communication channel, operated in response to receipt of a transmitted message from said communication channel, to sequentially store and operable to forward, each received message to said processing equipment;
comparator means connected to said message queue means and to said scan index counter means and to said processing equipment, operated in response to said scan index counter means to sequentially gate each message from said message queue means to said processing equipment.

6. A pulse regeneration system as claimed in claim 5, wherein: said message queue means includes a demultiplexor connected to said communication channel;
a plurality of message queue registers, each of said message queue registers providing for storage of one of said received messages; and
a multiplexor connected between each of said plurality of message queue registers and said comparator means, operated to transmit information representative of each of said received messages in said message queue registers, one-at-a-time to said processing equipment.

7. A pulse regeneration system as claimed in claim 6, wherein: there is further included:
an input pointer register connected to said demultiplexor;
an output pointer register connected to said multiplexor; and
a comparator connected between said input pointer register and said output pointer register operated to allocate the last received message, to an accessable message queue register and to control the transmission of information representative of the first queued message to said processing equipment.

8. A pulse regeneration system as claimed in claim 5, wherein there is further included:
receive register means connected between said communication channel and said message queue means, operated in response to said communication channel to store and subsequently forward each received message to said message queue means.

9. A pulse regeneration method for the transmission of information composed of a plurality of binary state changes of non-uniform time duration from a plurality of asynchronous pulse sources over a communication channel to processing equipment located remote to said pulse sources, comprising the steps of:
scanning said event sources for a determination of state change;
comparing said scanned present state value with the last-look value of said event source;
formulating a message describing the state change of the pulse source, its location and time of occurrence;
queuing said messages on a first-in, first-out basis for transmission at regular time intervals;
transmitting serially said queued messages via said communicaton channel;
receiving said transmitted messages sent over said communication channel;
converting said received messages to parallel form;
queuing said received messages for subsequent transfer to said processing equipment;
timing an appropriate predetermined interval in order to reconstruct said transmitted message; and
gating said queued messages one-at-a-time to said processing equipment.

10. A pulse regeneration method as claimed in claim 9, wherein: said step of queuing messages on a first-in, first-out basis further includes the steps of:

generating the contents of an input pointer register for indicating a first vacant message queue register;

storing said message in said indicated message queue register;

generating the contents of an output pointer register for indicating the next message queue register to be transmitted;

sending the contents of said next message queue register to be transmitted; and comparing said input and output pointer registers to determine the availability of said message queue registers.

11. A pulse regeneration method as claimed in claim 9, wherein: said step of queuing said received messges further includes the steps of:

generating the contents of an input pointer register for indicating a first vacant message queue register for storing said received message;

storing said received message in said indicated message queue register;

generating the contents of an output pointer register for indicating the next message queue register to be gated-out to said processing equipment;

sending the contents of said next message queue register to be gated-out to said processing equipment; and comparing said input and output pointer registers to determine the availability of a vacant message queue register and the identity of the message queue register containing the earliest received message.

* * * * *